United States Patent
Lee et al.

(10) Patent No.: US 10,416,810 B2
(45) Date of Patent: Sep. 17, 2019

(54) METHOD FOR OPERATING ELECTRONIC APPARATUS WITH INDEPENDENT POWER SOURCES

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 16/351,502

(22) Filed: Mar. 12, 2019

(65) Prior Publication Data

US 2019/0204987 A1    Jul. 4, 2019

Related U.S. Application Data

(63) Continuation of application No. 15/603,479, filed on May 24, 2017, now Pat. No. 10,289,240.

(30) Foreign Application Priority Data

Jun. 8, 2016  (TW) .................. 105118114

(51) Int. Cl.
  *G06F 3/041* (2006.01)
  *G06F 3/044* (2006.01)
  *G06F 1/26* (2006.01)

(52) U.S. Cl.
  CPC ............ *G06F 3/0416* (2013.01); *G06F 1/266* (2013.01); *G06F 3/044* (2013.01); *G06F 2203/04105* (2013.01); *G06F 2203/04107* (2013.01)

(58) Field of Classification Search
  CPC ........ G06F 3/0416; G06F 3/044; G06F 1/266; G06F 2203/04107
  See application file for complete search history.

(56) References Cited

U.S. PATENT DOCUMENTS

| 2012/0206664 A1* | 8/2012 | Brown | G06F 3/0412 349/12 |
| 2012/0262417 A1* | 10/2012 | Wakasugi | G06F 3/0416 345/174 |
| 2013/0328824 A1* | 12/2013 | Krah | G06F 3/041 345/174 |
| 2014/0008203 A1* | 1/2014 | Nathan | H03K 17/962 200/600 |

(Continued)

*Primary Examiner* — Abbas I Abdulselam
(74) *Attorney, Agent, or Firm* — Chun-Ming Shih; HDLS IPR SERVICES

(57) ABSTRACT

A method for operating electronic apparatus with independent power sources and having a functional circuit and a force and touch sensing circuit, the functional circuit and the force and touch sensing circuit are respectively powered by a first power source and a second power source different with the first power source. The method comprises (a) connecting the first power source and the second power source to different grounds; (b) the force and touch sensing circuit applying a capacitive sensing excitation signal to a force sensing electrode or a touch sensing electrode; and (c) the force and touch sensing circuit detecting a sensing signal from the force sensing electrode or the touch sensing electrode. In above step (b) or (c), the first power source and the second power source have no common current loop therebetween.

13 Claims, 10 Drawing Sheets

(56) References Cited

U.S. PATENT DOCUMENTS

2015/0002461 A1\* 1/2015 Guarneri ............. G06F 3/04886
 345/174
2017/0242524 A1\* 8/2017 Kim ...................... G06F 3/0416

\* cited by examiner

METHOD FOR OPERATING ELECTRONIC APPARATUS WITH INDEPENDENT POWER SOURCES

CROSS-REFERENCE TO RELATED APPLICATION

This application is a continuing application of U.S. patent application Ser. No. 15/603,479, filed on May 24, 2017, and entitled "METHOD FOR OPERATING ELECTRONIC APPARATUS WITH INDEPENDENT POWER SOURCES", which claims priority to TW105118114 filed Jun. 8, 2016. The entire disclosures of the above applications are all incorporated herein by reference.

BACKGROUND OF THE INVENTION

Field of the Invention

The method relates to a method for operating electronic apparatus, especially to a method for operating electronic apparatus with independent power sources.

Description of Prior Art

Touch display panel become widely popular as the compact portable electronic devices are widespread. The force and touch sensing technologies also have rapid progress due to the maturity of human-machine interface and the demand of 3D touch control. The conventional capacitive force and touch sensing devices are generally combined with display panel to implement the portable electronic devices. However, display source is a noise source and the sensing signal for force and touch sensing is very minute. It is important to enhance signal to noise ratio to ensure force and touch sensing accuracy and stability.

More particularly, the sensing electrodes for force and touch sensing are arranged in the LCD cell in In-cell touch display panel. The distance between the sensing electrodes and common electrode (Vcom) layer is only several micro meters if the sensing electrodes for force and touch sensing are embedded in the LCD cell. As a result, the capacitance between the sensing electrodes and Vcom layer is huge and the capacitance variation due to touch is too small to be sensed. The interference from the display signal will be more serious.

The present invention is aimed to provide a method for operating electronic apparatus with independent power sources such that the noise interference between functional circuits of the electronic apparatus can be eliminated.

SUMMARY OF THE INVENTION

The present invention provides a method for operating electronic apparatus with independent power sources to overcome above drawbacks.

Accordingly, the present invention provides a method for operating electronic apparatus with independent power sources, the electronic apparatus having a functional circuit powered by a first power source and a force and touch sensing circuit powered by a second power source different to the first power source, the method comprising: (a) connecting the first power source and the second power source to different grounds;
(b) the force and touch sensing circuit applying a capacitive sensing excitation signal to a force sensing electrode or a touch sensing electrode; and (c) the force touch sensing controller detecting a sensing signal from the force sensing electrode or the touch electrode, wherein in above step (b) or (c), the first power source and the second power source have no common current loop therebetween. The force and touch sensing circuit is connected to the functional circuit through only one physical connection point, and the force and touch sensing circuit applies a counter-exciting signal to the functional circuit

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
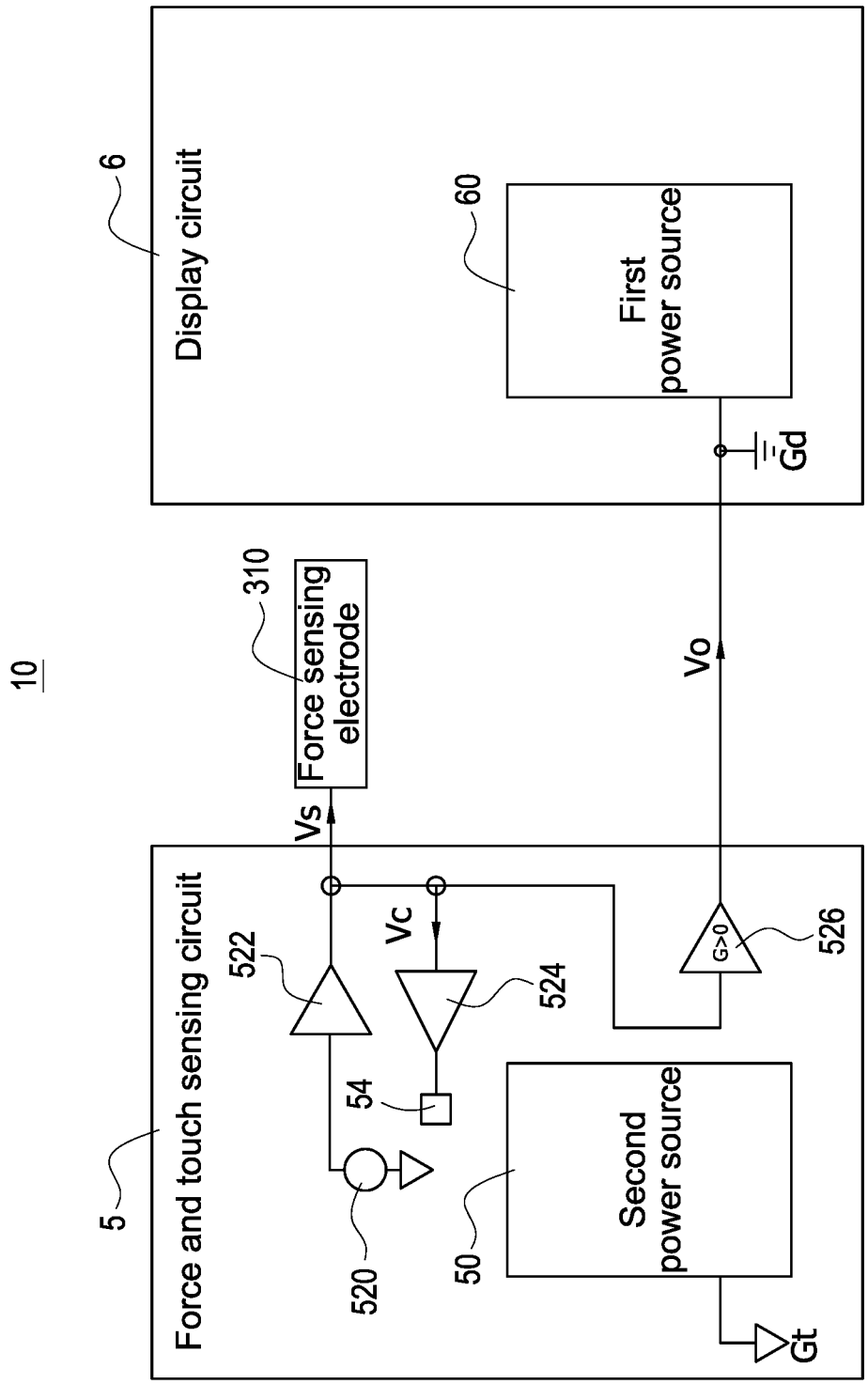
FIG. 1 is a schematic diagram of the electronic apparatus according to an embodiment of the present invention.

FIG. 1 is a schematic diagram of the electronic apparatus 10 according to an embodiment of the present invention. The electronic apparatus 10 is, for example, a liquid crystal display apparatus with force and touch sensing function. The following description exemplifies the electronic apparatus 10 with liquid crystal display apparatus; however, the scope of the present invention is not limited by the specific example. The electronic apparatus 10 comprises two functional circuits, namely, the force and touch sensing circuit 5 and the display circuit 6. The force and touch sensing circuit 5 comprises a force-touch power source (hereinafter the second power source) 50, a signal source 520, three amplifiers 522, 524, and 526, and a capacitance sensing circuit 54. The display circuit 6 comprises a display power source (hereinafter the first power source) 60. Moreover, the force-touch power source 50 has a force-touch ground Gt and the display power source has a display ground Gd, where the force-touch ground Gt and the display ground Gd are different grounds.

As shown in FIG. 1, in performing force or touch sensing, there is no common current loop between the force and touch sensing circuit 5 and the display circuit 6. More particularly, in performing force or touch sensing, there is no common current loop between the first power source 60 and the second power source 50. In performing force or touch sensing, the signal source 520 generates a capacitive sensing excitation signal Vs through the first amplifier 522 and then applies the capacitive sensing excitation signal Vs to a sensing electrode, such as the force sensing electrode 310 shown in FIG. 1. The capacitive sensing excitation signal Vs may also be applied to a touch sensing electrode, and the related description will be described later. The force and touch sensing circuit 5 measures the sensing signal Vc corresponding to the force sensing electrode 310 through the second amplifier 524 and then applies the sensing signal Vc to the capacitance sensing circuit 54, thus determining whether a force pressing operation is exerted on the force sensing electrode 310 or not. Moreover, the third amplifier 526 of the force and touch sensing circuit 5 processes the capacitive sensing excitation signal Vs into a counter-exciting signal Vo and then the force and touch sensing circuit 5 applies the counter-exciting signal Vo to a reference point of the display circuit 6 or the display ground Gd, where the reference point of the display circuit 6 may be a reference node of fixed voltage level (such as +3.3V, +5V or −5V) or a signal output end (such as Vcom). In other word, in performing force or touch sensing, the force and touch sensing circuit 5 is connected to the display circuit 6 through only one physical connection point such that there is no common current loop between the force and touch sensing circuit 5 and the display circuit 6.

Figure 2:
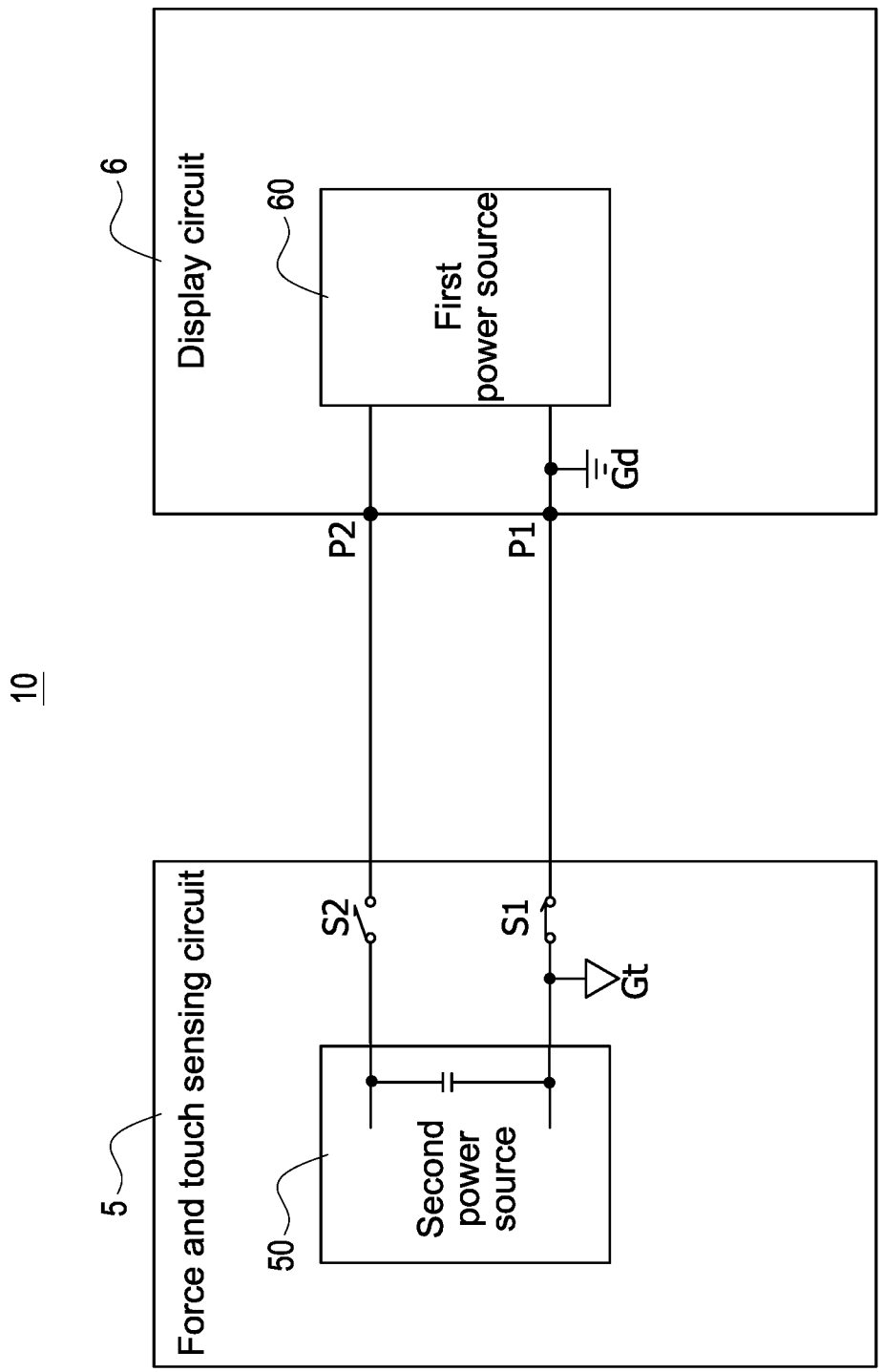
FIGS. 2 and 3 are schematic views showing the operations of the electronic apparatus according to another embodiment of the present invention.
Figure 3:
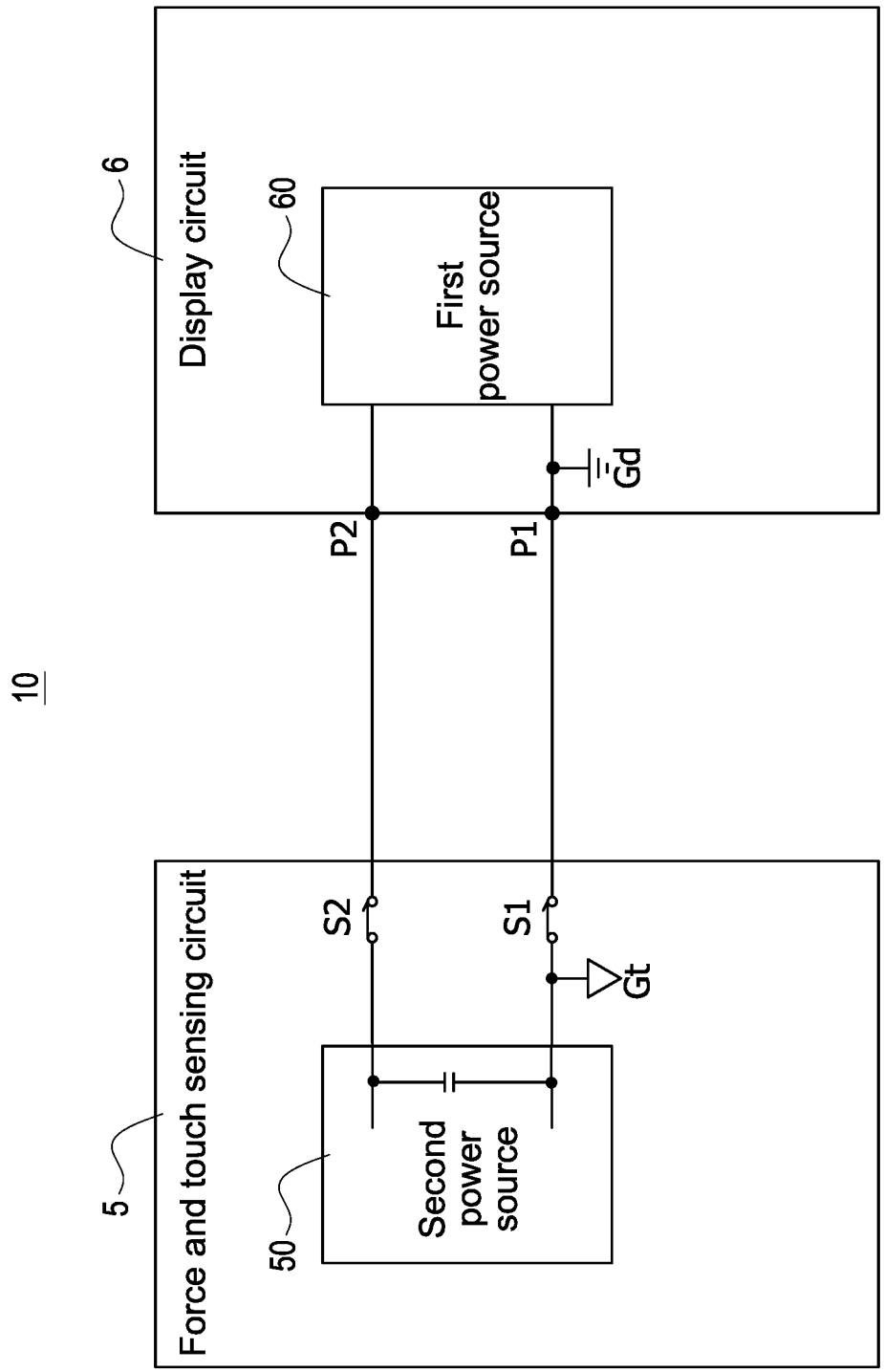

FIGS. 2 and 3 are schematic views showing the operations of the electronic apparatus 10 according to another embodiment of the present invention. Similarly, the electronic apparatus 10 is, for example, a liquid crystal display apparatus with force and touch sensing function. The following description exemplifies the electronic apparatus 10 with liquid crystal display apparatus; however, the scope of the present invention is not limited by the specific example. The electronic apparatus 10 comprises two functional circuits, namely, the force and touch sensing circuit 5 and the display circuit 6. The force and touch sensing circuit 5 comprises a second power source (the force-touch power source) 50, and the display circuit 6 comprises a first power source (the display power source) 60. Moreover, the force-touch power source 50 has a force-touch ground Gt and the display power source has a display ground Gd, where the force-touch ground Gt and the display ground Gd are different grounds. As shown in FIG. 2, in performing force or touch sensing operation (or non-charging operation), the force and touch sensing circuit 5 turns on the first switch (ground switch) S1 and turns off the second switch (loop charging switch) S2 such that there is no common current loop between the force and touch sensing circuit 5 and the display circuit 6 and the interference noise can be reduced. In other words, by operating the first switch S1 and the second switch S2, the force and touch sensing circuit 5 is connected to the display circuit 6 through only one physical connection point. Therefore, in performing force or touch sensing operation, the measurement of the force and touch sensing circuit 5 can be prevented from the influence of the display circuit 6. Moreover, in performing force/touch sensing operation or in performing non-charging operation, the static can also be prevented from accumulation. In above-mentioned operation, the static will be accumulated in the force and touch sensing circuit 5 and the display circuit 6 to damage the internal circuits thereof if the first switch S1 is also turned off. With reference to FIG. 3, in charging operation (namely, not in force/touch sensing operation), both of the first switch S1 and the second switch S2 are turned on such that the first power source 60 of the display circuit 6 can charge the second power source 50 of the force and touch sensing circuit 5 through the charging path provided by the turned on first switch S1 and second switch S2.

In above description, the first switch (ground switch) S1 and the second switch (loop charging switch) S2 may be transistor switch such as bipolar transistor switch or CMOS transistor switch. In one implementation of the present invention, at least one of the force and touch sensing circuit 5, the second power source 50, the first switch (ground switch) S1 and the second switch (loop charging switch) S2 is arranged in an integrated circuit chip. Moreover, the first switch (ground switch) S1 may be arranged in way other than that shown in FIGS. 2 and 3 (namely between the grounds of the first power source 60 and the second power source 50) as long as the first switch (ground switch) S1 can achieve connection/disconnection between the first power source 60 and the second power source 50). Moreover, the first switch (ground switch) S1 and the second switch (loop charging switch) S2 may achieve no common current loop between the first power source 60 and the second power source 50, or may achieve no common current loop between the display circuit 6 and the touch sensing circuit 5.

Figure 8B:
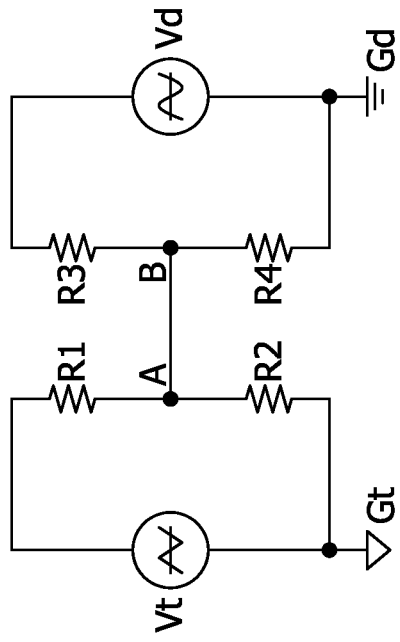
FIGS. 8A and 8B are drawings for explaining the theory based on which the effect of no common current loop can be realized.
Figure 8A:
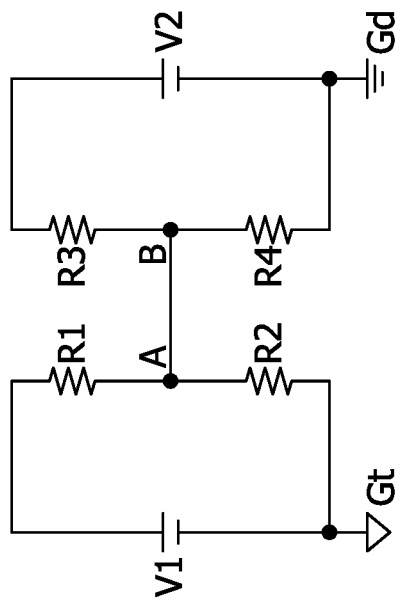

FIGS. 8A and 8B are drawings for explaining the theory based on which the effect of no common current loop can be realized. The node A on left circuit loop and the node B on right circuit loop are electrically connected to each other. Namely, the two circuits without common ground and without common power source have only one common node (AB) and the node A can be deemed to be the node B from circuit topology aspect. As shown in FIG. 8A, the voltage between node A and the second ground Gt is (V1*R2)/(R1+R2), while voltage between node B and the first ground Gd is (V2*R4)/(R3+R4). Namely, the voltage source V2 for the right circuit loop is independent with the left circuit loop, and the voltage source V1 for the left circuit loop is independent with the right circuit loop. FIG. 8B is another drawing for explaining the theory based on which the effect of no common current loop can be realized. As shown in FIG. 8B, the two circuits without common ground have only one common node (node A can be deemed to be the node B from circuit topology aspect). The left circuit loop has an alternating signal source Vt, which is a triangular wave signal. The right circuit loop has an alternating signal source Vd, which is a sinusoidal wave signal. Because the two circuits have no common current loop, the voltage between node A and the second ground Gt is purely triangular wave signal without sinusoidal component, while the voltage between node B and the first ground Gd is purely sinusoidal wave signal without triangular component. Simply put, the alternating signals of the two circuits will not interfere with each other. The two circuits shown in FIGS. 8A and 8B have only one physical connection with each other due to ground difference, therefore, the two circuits have no current loop therebetween and the signals thereof will not interfere with each other. It should be noted that "no common current loop" in this application includes the situation where stray capacitance might be present between two circuits. The two circuits might be formed with stray capacitance present therebetween. However, the connection path formed by stray capacitance is not physical connection path. Therefore, "no common current loop" in this application means that the two circuits have one physical connection therebetween and may have additional stray capacitance therebetween.

Figure 4:
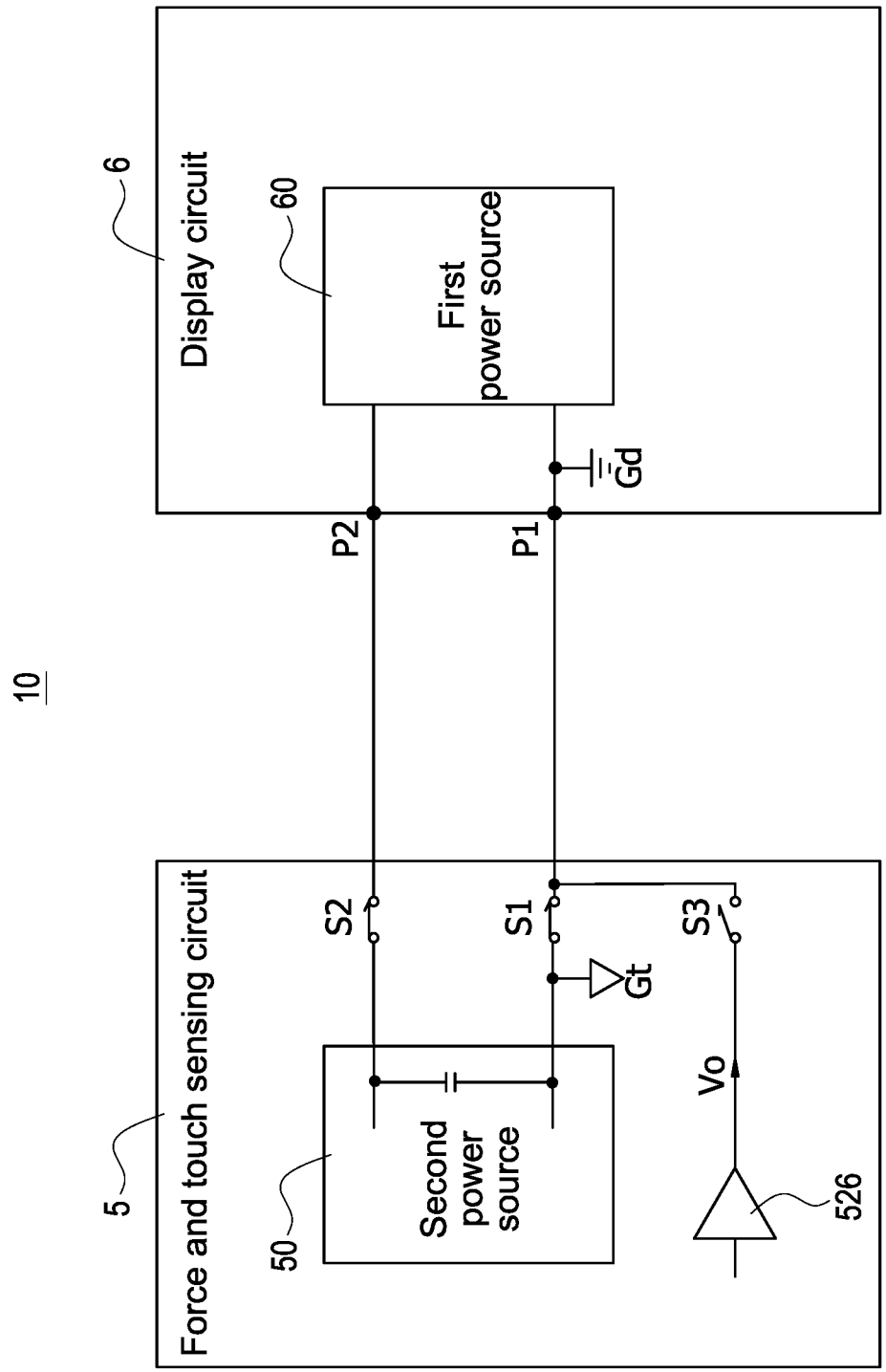
FIGS. 4 and 5 are schematic views showing the switch operations of the electronic apparatus in force/touch sensing stage or non-force/touch sensing stage.
Figure 5:
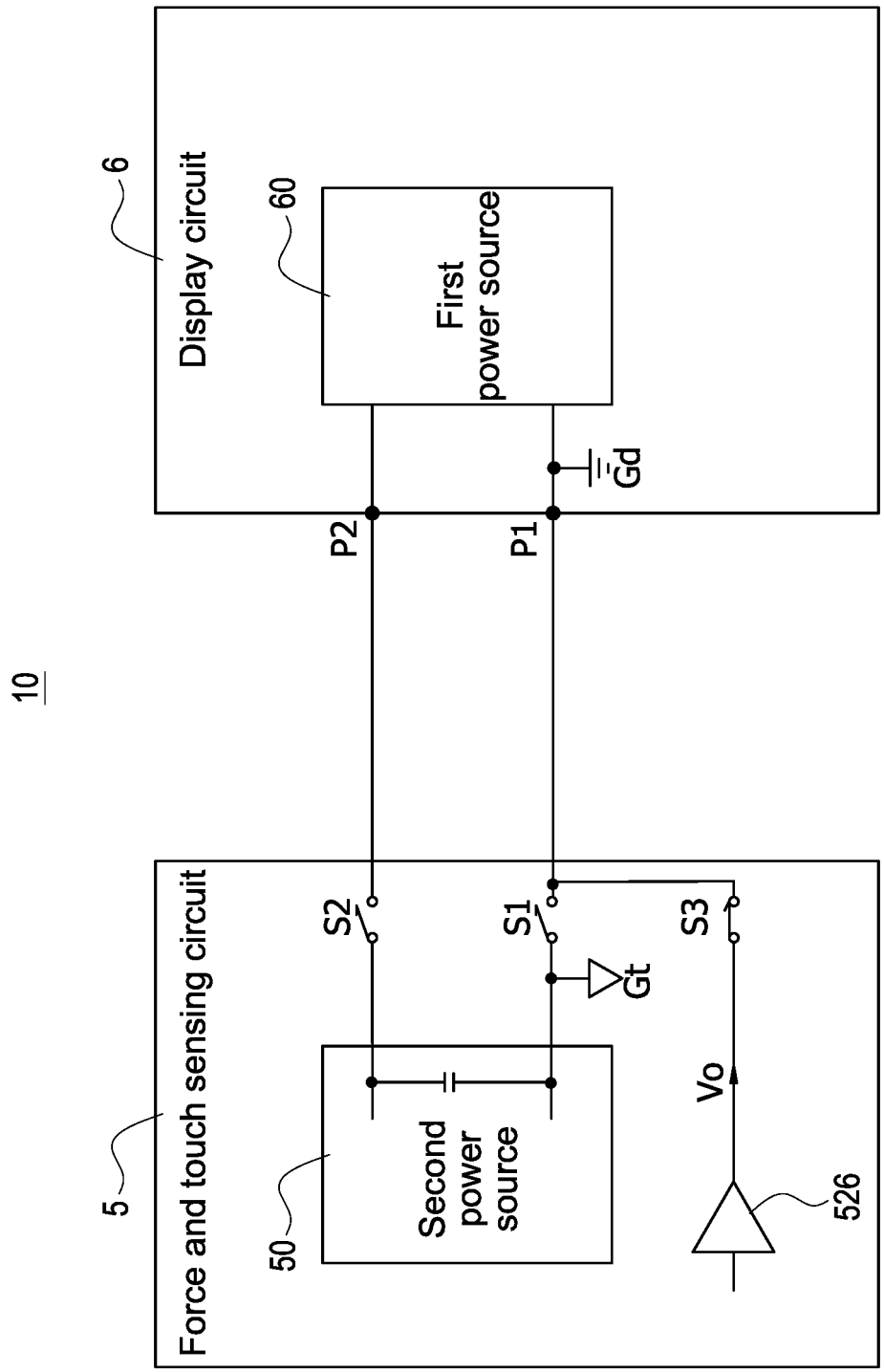

FIGS. 4 and 5 are schematic views showing the switch operations of the electronic apparatus 10 in force/touch sensing stage or non-force/touch sensing stage, the elements shown in FIGS. 4 and 5 are similar to those shown in FIGS. 2 and 3, therefore, the detailed description thereof is omitted here for brevity. As shown in FIG. 4, in non-force/touch sensing stage, the first switch (ground switch) S1 and the second switch (loop charging switch) S2 are turned on such that the first power source 60 of the display circuit 6 can charge the second power source 50 of the force and touch sensing circuit 5 through the charging path provided by the turned on first switch S1 and second switch S2. Moreover, the third switch (signal output switch) S3 connected between the third amplifier 526 and the display circuit 6 is turned off. As shown in FIG. 5, in force/touch sensing stage, the first switch (ground switch) S1 and the second switch (loop charging switch) S2 are turned off while the third switch (signal output switch) S3 connected between the third amplifier 526 and the display circuit 6 is turned on. Therefore, the counter-exciting signal Vo resulted from the capacitive sensing excitation signal Vs can be applied to the display circuit 6 to further suppress the noise from the display circuit 6, which is coupled through stray capacitance.

Figure 6A:
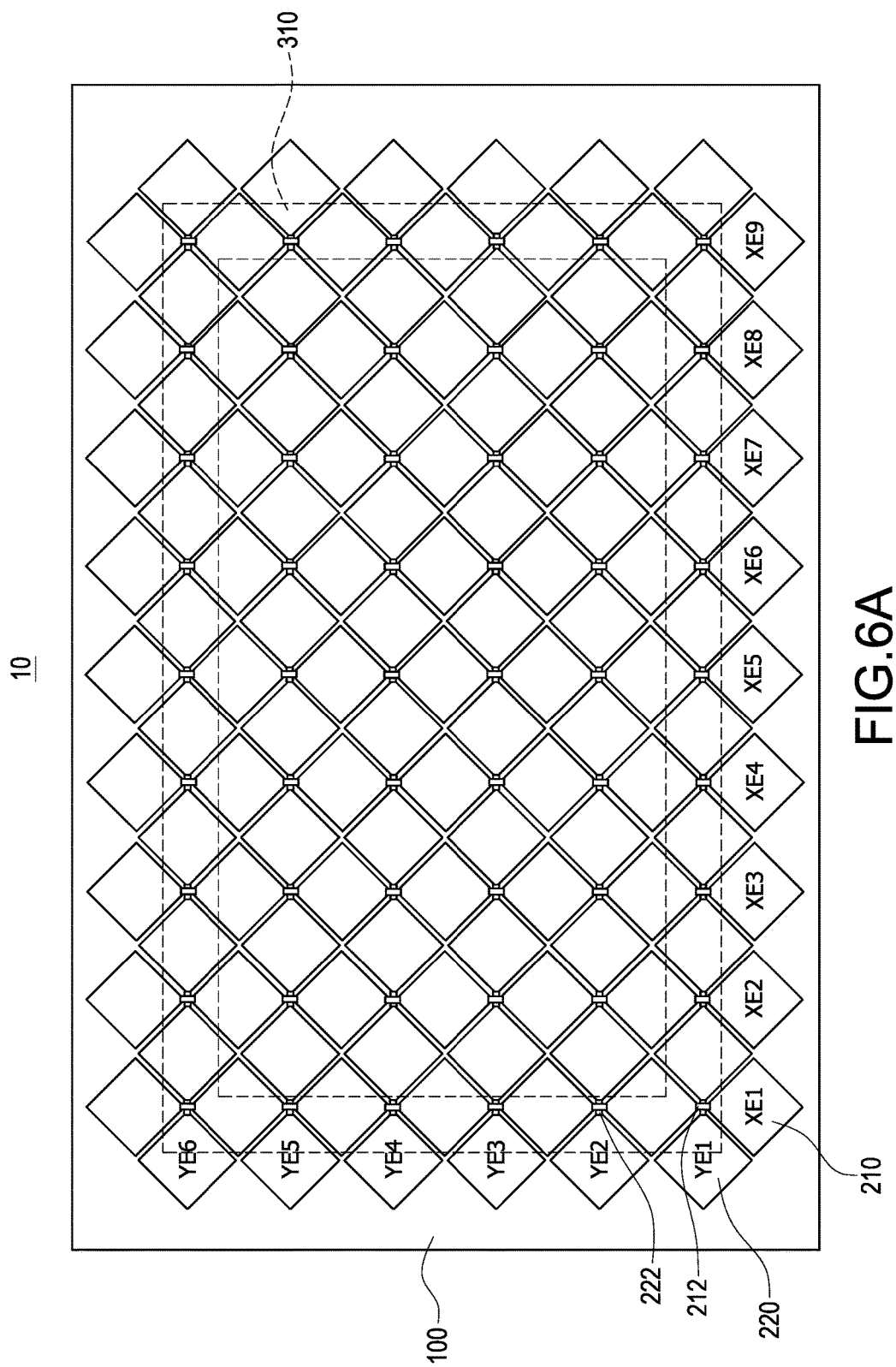
FIGS. 6A to 6C respectively show the partial top view and the partial sectional views of the electronic apparatus with independent power sources according to an embodiment of the present invention.
Figure 6B:
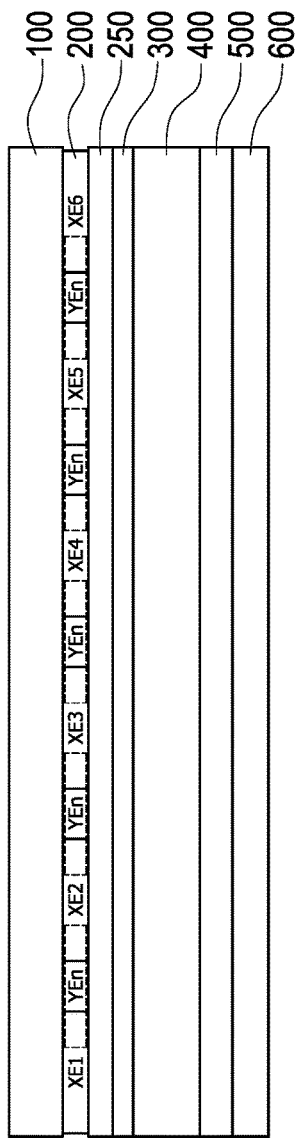

FIGS. 6A and 6B respectively show the partial top view and the partial sectional view of the electronic apparatus with independent power sources according to an embodiment of the present invention, where the top view mainly depicts the touch electrodes (also referred to as touch sensing electrodes) in touch and force sensing operation. As shown in FIG. 6B, the electronic apparatus 10 comprises, from top to bottom, a protection layer 100, a touch electrode layer 200, an insulation layer 250, a force electrode layer 300, a resilient dielectric layer 400, a reference force electrode layer 500 and a substrate 600. The protection layer 100 has a first face and a second face, while the touch electrode layer 200 is arranged on the second face. With reference again to FIG. 6A, the touch electrode layer 200 comprises a plurality of first touch electrodes XE1~XEn (210) and a plurality of second touch electrodes YE1~YEn (220) coplanar with the first touch electrodes XE1~XEn. Each two adjacent first touch electrodes XE1~XEn of the same column are connected by a conductive bridge 212, while each two adjacent second touch electrodes YE1~YEn of the same row are connected by a conductive bridge 222. Moreover, first touch electrodes XE1~XEn extend along a first direction while the second touch electrodes YE1~YEn extend along a second direction, which is substantially perpendicular to the first direction. With reference to FIG. 6B, an insulation layer 250 is arranged between the touch electrode layer 200 and the force electrode layer 300 to provide electric isolation between the touch electrode layer 200 and the force electrode layer 300. The force electrode layer 300 has at least one force sensing electrode 310 (shown by dashed lines in FIG. 6B) to sense force exerted thereon.

With reference also to FIG. 1, in performing force sensing or touch sensing, the signal source 520 generates a capacitive sensing excitation signal Vs through the first amplifier 522 and then applies the capacitive sensing excitation signal Vs to a sensing electrode, such as the force sensing electrode 310 or a touch electrode (for example, the first touch electrodes XE1~XEn or the second touch electrodes YE1~YEn shown in FIG. 6A). The force and touch sensing circuit 5 measures the sensing signal Vc corresponding to the force sensing electrode 310 (or corresponding to the touch electrode) through the second amplifier 524 and then applies the sensing signal Vc to the capacitance sensing circuit 54, thus determining whether a force pressing operation is exerted on the force sensing electrode 310 or whether a touch operation is exerted on the touch electrode. Moreover, the third amplifier 526 of the force and touch sensing circuit 5 processes the capacitive sensing excitation signal Vs into a counter-exciting signal Vo and then the force and touch sensing circuit 5 applies the counter-exciting signal Vo to a reference point of the display circuit 6 or the display ground Gd, where the reference point of the display circuit 6 may be a reference node of fixed voltage level (such as +3.3V, +5V or −5V) or a signal output end (such as Vcom). In other word, in performing force or touch sensing, the force and touch sensing circuit 5 is connected to the display circuit 6 through only one physical connection point such that there is no common current loop between the force and touch sensing circuit 5 and the display circuit 6. Alternatively, there is no common current loop between the first power source 60 and the second power source 50. In the embodiment shown in FIG. 6B, a reference force electrode layer 500 is arranged between the resilient dielectric layer 400 and the substrate 600, and a suitable bias is applied to the reference force electrode layer 500 to enhance measurement accuracy for force sensing.

Figure 6C:
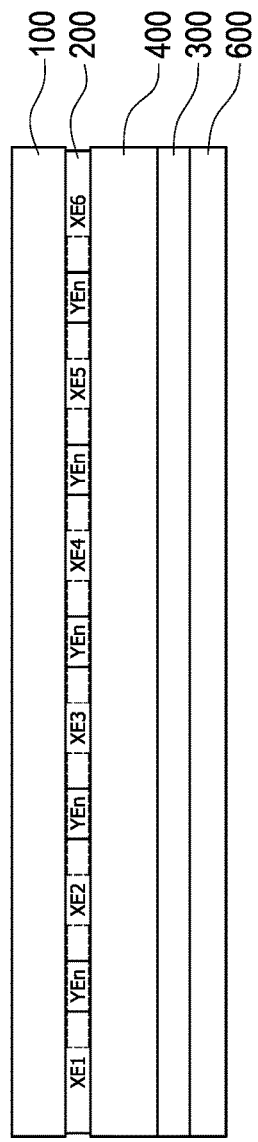

FIG. 6C shows the partial sectional view of the electronic apparatus with independent power sources according to another embodiment of the present invention. In comparison with the embodiment in FIG. 6B, the embodiment shown in FIG. 6C eliminates the insulation layer 250 and the reference force electrode layer 500, and exchanges the positions of the force electrode layer 300 and the resilient dielectric layer 400.

Figure 7A:
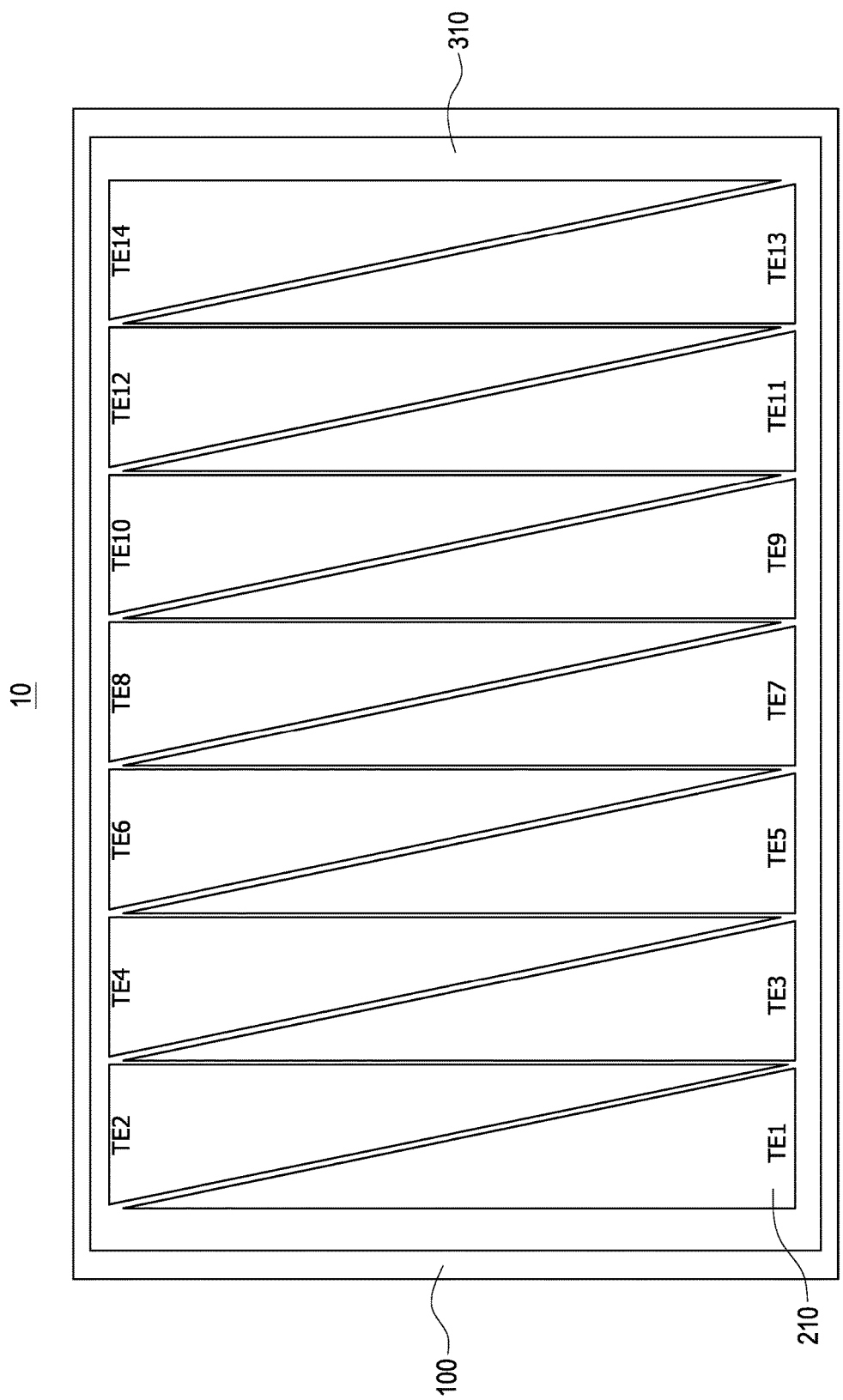
FIGS. 7A and 7B respectively show the partial top views of the electronic apparatus with independent power sources according to another embodiment of the present invention.
Figure 7B:
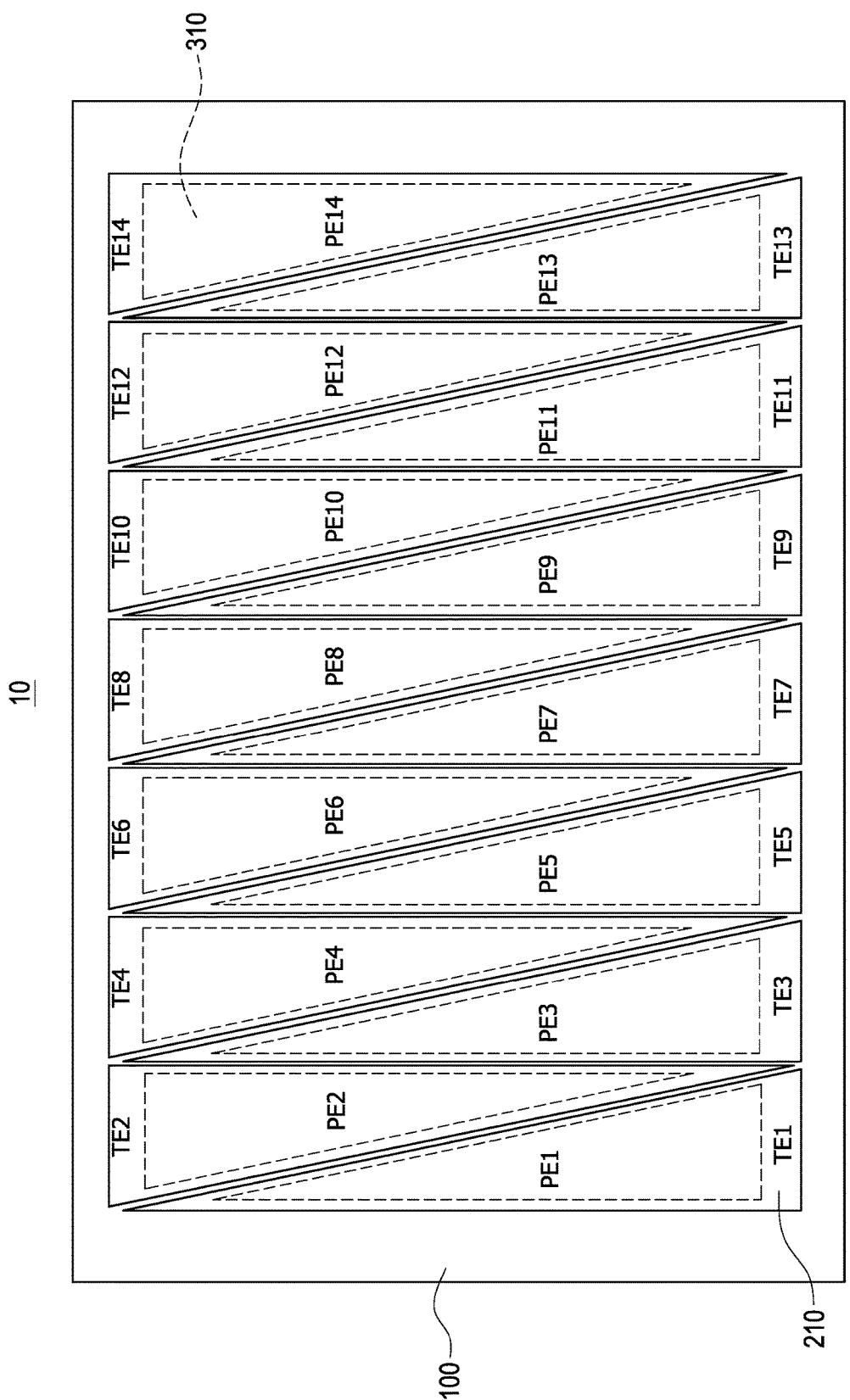

FIGS. 7A and 7B respectively show the partial top views of the electronic apparatus with independent power sources according to another embodiment of the present invention, where the top view mainly depicts the touch electrodes in touch and force sensing operation. In comparison with the embodiments shown in FIGS. 6A and 6B, the embodiments shown in FIGS. 7A and 7B adopt self-capacitance sensing scheme. More particularly, the plurality of touch sensing electrodes TE1~TE14 are triangular touch sensing electrodes staggered to each other. In the embodiment shown in FIG. 7A, the force electrode layer 300 has a force sensing electrode 310. In the embodiment shown in FIG. 7B, the force electrode layer 300 has a plurality of triangular force sensing electrode PE1~PE14, and each of force sensing electrode PE1~PE14 is shielded by a corresponding touch sensing electrode from the view of user.

The above mentioned embodiments are exemplified with two functional circuits, namely, the force and touch sensing circuit 5 (the second functional circuit) and the display circuit 6 (the first functional circuit). Nevertheless, the invention can also be used for electronic apparatus with more functional circuits. For example, the electronic apparatus may include a backlight circuit as the third functional circuit and use other switch to no common current loop between the force and touch sensing circuit 5 (the second functional circuit) and the backlight circuit (the third functional circuit) in force/touch sensing operation. Similarly, the force and touch sensing circuit 5 can be prevented from influence of the backlight circuit (the third functional circuit) in force/touch sensing operation. Moreover, the functional circuit may also be a display control circuit connected to a display unit to control the image/video display of the display unit.

The present invention has following advantages:

1. The different functional circuits have their own independent power sources such that each two independent power sources have no common current loop in force/touch sensing operation to prevent interference of each other.

2. By operating the switches, the different functional circuits can be switched between force/touch sensing operation and charging operation.

3. In force/touch sensing operation, a signal (namely the counter-exciting signal) related to the capacitive sensing excitation signal is applied to functional circuit other than the force and touch sensing circuit to eliminate the interference from the other functional circuit.

4. The force and touch sensing circuit, the second power source and the loop charging switch are arranged on the same integrated circuit chip to simplify package and reduce cost.

Thus, particular embodiments have been described. Other embodiments are within the scope of the following claims. For example, the actions recited in the claims may be performed in a different order and still achieve desirable results.

What is claimed is:

1. A method for operating electronic apparatus with independent power sources, the electronic apparatus having a functional circuit powered by a first power source and a force and touch sensing circuit powered by a second power source different to the first power source, the method comprising:
   (a) connecting the first power source and the second power source to different grounds;
   (b) the force and touch sensing circuit applying a capacitive sensing excitation signal to a force sensing electrode or a touch sensing electrode; and
   (c) the force touch sensing circuit detecting a sensing signal from the force sensing electrode or the touch electrode,
   wherein in above step (b) or (c), the first power source and the second power source have no common current loop therebetween, the force and touch sensing circuit is connected to the functional circuit through only one physical connection point during force-touch sensing operation, and the force and touch sensing circuit applies a counter-exciting signal to the functional circuit,
   wherein the force and touch sensing circuit is connected to the functional circuit through at least two physical connection points during non-force-touch sensing operation;
   wherein the counter-exciting signal is generated by non-inverting amplification of the capacitive sensing excitation signal.

2. The method in claim 1, wherein the force and touch sensing circuit apply the counter-exciting signal to a reference point of the functional circuit or a ground of the functional circuit through the only one physical connection point.

3. The method in claim 2, wherein the functional circuit is a display circuit or a backlight circuit.

4. The method in claim 3, wherein the reference point is a node of the display circuit with fixed voltage level or a signal output end of the display circuit.

5. The method in claim 4, wherein the node with fixed voltage level is node with positive voltage, node with negative voltage or a zero-voltage node of the first power source.

6. The method in claim 1, wherein the functional circuit and the force and touch sensing circuit have no common current loop therebetween in force or touch sensing operation.

7. The method in claim 1, wherein the first power source and the second power source are connected to have common current loop therebetween during non-force sensing or non-touch sensing operation.

8. The method in claim 1, further comprising:
   providing a switch connected between a ground of the first power source and a ground of the second power source to control a connection and a disconnection between the first power source and the second power source.

9. The method in claim 8, wherein the force and touch sensing circuit, the second power source and the switch are arranged in a same integrated circuit chip.

10. The method in claim 8, wherein the switch is a transistor switch.

11. The method in claim 1, further comprising:
    providing a loop charging switch connected between the first power source and the second power source,
    wherein the loop charging switch is turned on and the first power source charges the second power source during non-force sensing or non-touch sensing operation.

12. The method in claim 11, wherein the force and touch sensing circuit, the second power source and the loop charging switch are arranged in a same integrated circuit chip.

13. The method in claim 11, wherein the loop charging switch is a transistor switch.

* * * * *